United States Patent [19]

Bither

[11] Patent Number: 4,613,635

[45] Date of Patent: Sep. 23, 1986

[54] COMPOSITION FOR PREPARING PAPERBOARD CONTAINER FOR LIQUIDS

[75] Inventor: Peter G. Bither, New Castle County, Del.

[73] Assignee: Hercules Incorporated, Wilmington, Del.

[21] Appl. No.: 720,646

[22] Filed: Apr. 8, 1985

[51] Int. Cl.$^4$ .................... C08L 77/06; C08L 61/22
[52] U.S. Cl. ........................................ 524/14; 524/47; 524/300; 525/183; 525/184; 428/292; 162/157.4; 162/157.5; 162/164.6
[58] Field of Search ............ 524/13, 14, 47, 300; 162/157.4, 157.5, 164.6; 525/183, 184; 428/292

[56] References Cited

U.S. PATENT DOCUMENTS 4,154,647  5/1979  Rave .................................. 428/395
4,273,892  6/1981  Rave .................................. 162/164.6

*Primary Examiner*—Morton Foelak
*Assistant Examiner*—Nathan M. Nutter
*Attorney, Agent, or Firm*—Joanne W. Patterson

[57] ABSTRACT

Disclosed is a composition useful for preparing paperboard containers comprising wood pulp, polyolefin pulp containing carboxylic functionality and a water-soluble cationic wet-strength resin. The paperboard is used for preparing containers for liquids such as juices and dairy products. The filled containers have improved durability when exposed to high humidity.

8 Claims, No Drawings

COMPOSITION FOR PREPARING PAPERBOARD CONTAINER FOR LIQUIDS

FIELD OF INVENTION

This invention relates to compositions useful for preparing containers for liquids. This invention especially relates to the incorporation of polyolefin pulp containing carboxylic fuctionality and a water-soluble cationic wet-strength resin into wood pulp to produce a composition useful for the manufacture of paperboard. The paperboard is used for preparing containers for liquids such as, for example, juice and dairy products. The filled containers have improved durability and therefore a longer shelf life than currently available containers for liquids.

BACKGROUND OF THE INVENTION

Currently available containers for liquids such as orange juice, milk, sour cream and liquid quiche generally are multi-ply structures of metal foil, such as aluminum foil, and polyethylene-coated bleached paperboard. The shelf life of the filled container is normally less than 14 days. During this time period the paperboard tends to absorb moisture from the contents of the container and from the surrounding atmosphere, causing the container to bulge and to feel soft to the hand. This bulging results in product returns from the retailer even though the quality of the liquid in the container is still satisfactory.

The problem of bulging is especially severe when the containers are stored in a non-frost free environment, e.g. in a walk-in refrigerator, where the relative humidity is above 90%. Increasing the thickness of the polyethylene coating does not solve the problem of moisture absorption by the paperboard, and in some cases may have a negative effect because more moisture is trapped in the board.

SUMMARY OF THE INVENTION

It has now been found that incorporation of polyolefin fibers and a water-soluble cationic wet-strength resin into the wood pulp used to prepare paperboard containers for liquids will improve the strength, toughness and rigidity of the container not only under ambient conditions, but also after exposure to high humidity. The increased durability of the container extends the shelf life of the packaged product and results in a lower product return from retailers.

The composition of this invention comprises (1) wood pulp, (2) from about 1% to about 10%, based on the weight of the wood pulp on a dry basis, of a polyolefin pulp containing carboxylic functionality, and (3) from about 0.05% to about 0.6%, based on the weight of the wood pulp on a dry basis, of a cationic water-soluble wet-strength resin. Papermaking additives such as sizing agents, retention aids, etc. may optionally be added to the composition.

DETAILED DESCRIPTION OF THE INVENTION

Polyolefin pulps are very fine, highly-branched, discontinuous fibers made from polyolefins such as polyethylene, polypropylene, an ethylene-propylene copolymer or a mixture of any of these polyolefin materials. Such pulps are known in the art, as are their methods of manufacture. See, e.g., "Pulp, Synthetic", Kirk-Othmer, *Encyclopedia of Chemical Technology*, 3rd. ed. (New York, 1982) Vol. 19, pp. 420–435, which is incorporated herein by reference.

The fibers (fibrids) of which polyolefin pulp is composed have a high surface area, in general at least 1 square meter per gram, lengths which will be in the range of from about 0.5 millimeter to about 10 millimeters, and diameters of about 1 micron to about 100 microns.

The polyolefin pulp containing carboxylic functionality used in the present invention can be a polyolefin polymer pulp containing carboxyl groups which have been introduced into the polymer molecule by grafting the polyolefin with a monomer containing carboxylic functionality or by oxidizing the polyolefin with oxygen or ozone, or a polyolefin may be cospurted with an anionic polymer containing carboxylic functionality. The anionic polymer may be a polyolefin containing carboxyl groups directly attached to the polymer backbone; a polyolefin grafted with acrylic acid, methacrylic acid, maleic anhydride or mixtures thereof; a copolymer of any of ethylene, propylene, styrene, alpha-methylstyrene or mixtures thereof with any one of acrylic acid, methacrylic acid, maleic anhydride or mixtures thereof; as well as mixtures of any these anionic polymer components. Bonding between the carboxyl groups of the spurted polyolefin pulp and the —OH groups of the cellulose in the wood pulp is believed to contribute to the increased durability of the paperboard.

In this specification, all parts and percentages are by weight unless otherwise specified.

The amount of polyolefin pulp (dry basis) to be used in the composition is from about 1% to about 10% based on the weight of the wood pulp. An amount of from about 4% to about 5% is preferred. The optimum amount will depend on the polyolefin pulp chosen and the properties desired in the final paperboard sheet. Generally it has been found that as the amount of polyolefin pulp increases, the durability of the paperboard sheet also increases.

The cationic water-soluble wet-strength resin used in the composition of this invention is a cationic starch, such as cationic potato starch, or a water-soluble aminopolyamide-epichlorohydrin resin.

Suitable aminopolyamide-epichlorohydrin resins are disclosed and described in U.S. Pat. Nos. 2,926,116 and 2,926,154, the disclosures of which are incorporated herein by reference. The aminopolyamide is derived by reaction of a dicarboxylic acid and a polyalkylene polyamine in a mole ratio of polyalkylene polyamine to dicarboxylic acid of from about 0.8:1 to about 1.4:1.

Particularly suitable dicarboxylic acids are diglycolic acid and saturated aliphatic dicarboxylic acids containing from 3 through 10 carbon atoms such as malonic acid, succinic acid, glutaric acid, adipic acid, pimelic acid, suberic acid, azelaic acid, and sebacic acid.

Other suitable dicarboxylic acids include terephthalic acid, isophthalic acid, phthalic acid, maleic acid, fumaric acid, itaconic acid, glutaconic acid, citraconic acid, and mesaconic acid.

The available anhydrides of the above acids can be used in preparing the water-soluble aminopolyamide as well as the esters of the acids. Mixtures of two or more dicarboxylic acids, their anhydrides, and their esters can be used to prepare the water-soluble aminopolyamides, if desired.

A number of polyalkylene polyamines, including polyethylene polyamines, polypropylene polyamines, polybutylene polyamines and the like can be employed. Polyalkylene polyamines can be represented as polyamines in which the nitrogen atoms are linked together by groups of the formula —$C_nH_{2n}$—where n is a small integer greater than unity and the number of such groups in the molecule ranges from two up to about eight. The nitrogen atoms can be attached to adjacent carbon atoms in the groups—$C_nH_{2n}$—or to carbon atoms farther apart, but not to the same carbon atom. Polyamines such as diethylenetriamine, triethylenetetramine, tetraethylenepentamine, and dipropylenetriamine, which can be obtained in reasonably pure form are suitable for preparing water-soluble aminopolyamides. Other polyalkylene polyamines that can be used include methyl bis-(3-aminopropyl)amine; methyl bis-(2-aminoethyl)amine; and 4,7-dimethyltriethylenetetramine. Mixtures of polyalkylene polyamines can be used, if desired.

The spacing of an amino group on the aminopolyamide can be increased if desired. This can be accomplished by substituting a diamine such as ethylenediamine, propylenediamine, hexamethylenediamine and the like for a portion of the polyalkylene polyamine. For this purpose, up to about 80% of the polyalkylene polyamine can be replaced by a molecular equivalent of diamine. Usually, a replacement of about 50% or less will be adequate.

Temperatures employed for carrying out the reaction between the dicarboxylic acid and the polyalkylene polyamine can vary from about 110° C. to about 250° C. or higher at atmospheric pressure. For most purposes temperatures between about 160° C. and 210° C. are preferred. The time of reaction will usually vary from about ½ hour to 2 hours. Reaction time varies inversely with reaction temperatures employed.

In carrying out the reaction, it is preferred to use an amount of dicarboxylic acid sufficient to react substantially completely with the primary amine groups of the polyalkylene polyamine but insufficient to react with the secondary amine groups and/or tertiary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 can be used. The aminopolyamide, derived as above described, is reacted with epichlorohydrin at a temperature of from about 45° C. to about 100° C., and preferably between about 45° C. and 70° C., until the viscosity of a 20% solids solution in water at 25° C. has reached about C or higher on the Gardner-Holdt scale. This reaction is preferably carried out in aqueous solution to moderate the reaction. pH adjustment is usually not necessary. However, since the pH decreases during the polymerization phase of the reaction, it may be desirable, in some cases, to add alkali to combine with at least some of the acid formed. When the desired viscosity is reached, water can be added to adjust the solids content of the resin solution to a desired amount, usually from about 2% to about 50%.

In the aminopolyamide-epichlorohydrin reaction, satisfactory results can be obtained utilizing from about 0.1 mole to about 2 moles of epichlorohydrin for each secondary or tertiary amine group of the aminopolyamide, and preferably from about 1 mole to about 1.5 moles of epichlorohydrin.

The aminopolyamide-epichlorohydrin resin comprises from about 0.05% to about 0.6% of the composition of this invention, based on the weight of the wood pulp on a dry basis. From about 0.2% to about 0.3% is preferred.

The wood pulp used in the composition may be any of the pulps commonly used in the manufacture of paperboard. Softwood kraft or a mixture of softwood kraft and hardwood kraft are preferred.

Conventional additives such as, for example, sizing agents and dry strength agents may be added to the pulp before formation of the paperboard sheet. External sizing and strength agents may also be added at the surface of the formed sheet.

EXAMPLE A

The preferred polyolefin pulp containing carboxylic functionality is a mixture of high density polyethylene coflashed with an ethylene/acrylic acid copolymer. The polyolefin pulp is prepared as follows.

Ninety parts of high density polyethylene (DuPont, melt index 5.5–6.5 at 190° C.) and 10 parts of an ethylene-acrylic acid copolymer (Dow, 92:8 ethylene:acrylic acid, melt index 5.3) are charged to a closed autoclave along with 400 parts of pentane as the solvent. The contents of the autoclave are stirred and heated to 193° C. at which point the vapor pressure in the autoclave is raised to 1650 psi by the introduction of nitrogen. The resulting solution is spurted from the autoclave into the atmosphere through an orifice having a diameter of one millimeter and a length of one millimeter, resulting in evaporation of the pentane solvent and formation of the desired fiber product. This fiber product is then disc refined for six minutes in a Sprout Waldron disc refiner at 1.5% consistency in water.

EXAMPLE B

This example illustrates the preparation of a cationic, water-soluble wet-strength resin from diethylenetriamine, adipic acid and epichlorohydrin. 0.97 Mole diethylenetriamine is added to a reaction vessel equipped with a mechanical stirrer, a thermometer and a reflux condenser. One mole of adipic acid is then gradually added to the reaction vessel with stirring. After the acid dissolves in the amine, the reaction mixture is heated to 170°–175° C. and held at that temperature for about one and one-half hours until the reaction mixture becomes very viscous. The reaction mixture is then cooled to 140° C., and sufficient water is added to produce a polyamide solution with a solids content of about 50%. A sample of the polyamide isolated from this solution has a reduced specific viscosity of 0.155 deciliters per gram when measured at a concentration of two percent in a one molar aqueous solution of ammonium chloride. The polyamide solution is diluted to 13.5% solids and heated to 40° C., and epichlorohydrin is slowly added in an amount corresponding to 1.32 moles per mole of secondary amine in the polyamide. The reaction mixture is then heated at a temperature between 70° and 75° C. until it attains a Gardner Holdt viscosity of E-F. Sufficient water is added to provide a solids content of about 12.5%, and the solution is cooled to 25° C. The pH of the solution is then adjusted to 4.7 with concentrated sulfuric acid. The final product contains 12.5% solids and has a Gardner Holdt viscosity of B-C.

EXAMPLES 1-3

Polyethylene pulp having carboxylic functionality is prepared as described in Example A. Varying amounts of the polyethylene pulp, as shown in Table 1, are blended with bleached softwood kraft by dispersing both in water at 2% consistency. 0.25% by weight, based on the weight of the wood pulp on a dry basis, of alkylketene dimer sizing agent and 0.25% by weight, based on the weight of the wood pulp on a dry basis, of cationic wet-strength resin prepared as described in Example B are added to the pulp. The pulp is then formed into sheets, dewatered and dried on conventional papermaking equipment. 10% total solids enzyme-converted pearl starch is added at the size press with an add on of approximately 6 lbs./ream of paper. A solution of 2% unconverted pearl starch containing colloidal silica is applied to the surface of the sheet at the wet stack.

Paperboard containing varying amounts of polyethylene pulp, prepared as described above, and a control containing no polyolefin pulp are subjected to tensile energy absorption (TEA) and Mullen plybond (burst) tests under ambient conditions. The results are given in Table 1. The data are an average of five determinations for weight, ten for caliper, five for TEA and four for Mullen plybond.

TABLE 1

| Example | % Polyethylene Pulp | Weight lbs./ream | Caliper 1/1000 inch | TEA ft. lbs./ft$^2$ MD | TEA ft. lbs./ft$^2$ CD | Mullen Plybond psi |
|---|---|---|---|---|---|---|
| Control | 0 | 210.2 | 16.2 | 12.4 | 22.2 | 123 |
| 1 | 5.0 | 212.5 | 16.3 | 13.7 | 26.0 | 141 |
| 2 | 6.0 | 211.8 | 16.5 | 16.3 | 27.6 | 153 |
| 3 | 7.5 | 206.3 | 16.0 | 12.2 | 25.9 | 164 |

Samples of the same paperboard sheets are brought to an equilibrium moisture content at 25% relative humidity (RH) and are then conditioned and tested at 45% and 93% RH for STFI short span compression in both the machine direction (MD) and the cross direction (CD), and for Z tensile. The results are given in Table 2. The data are an average of two determinations for moisture content, five for Z tensile and twenty for STFI compression.

TABLE 2

| Example | % Polyethylene Pulp | Moisture Content of Board % | Z Tensile, psi | MD STFI Short Span Compression, lbs./in. | CD STFI Short Span Compression, lbs./in. |
|---|---|---|---|---|---|
| 45% Humidity | | | | | |
| Control | 0 | 5.56 | 56 ± 0.9 | 59.6 ± 2.7 | 40.0 ± 2.6 |
| 1 | 5.0 | 4.56 | 64 ± 1.5 | 62.9 ± 2.8 | 40.7 ± 2.4 |
| 2 | 6.0 | 5.29 | 69 ± 1.9 | 62.8 ± 3.2 | 41.4 ± 1.9 |
| 3 | 7.5 | 5.14 | 77 ± 1.8 | 62.6 ± 2.7 | 40.5 ± 1.6 |
| 93% Humidity | | | | | |
| Control | 0 | 13.6 | 38 ± 1.9 | 22.6 ± 1.6 | 16.2 ± 1.2 |
| 1 | 5.0 | 12.4 | 43 ± 1.5 | 27.3 ± 2.2 | 19.5 ± 1.7 |
| 2 | 6.0 | 12.5 | 47 ± 1.5 | 27.0 ± 1.4 | 20.1 ± 1.5 |
| 3 | 7.5 | 12.8 | 53 ± 1.3 | 26.8 ± 1.7 | 19.7 ± 1.6 |

EXAMPLE 4

Polyethylene pulp having carboxylic functionality is prepared as described in Example A. 3% Polyethylene pulp, based on the weight of the wood pulp on a dry basis, is blended with Manitoba unbleached kraft by dispersing both in water. The pulp is then refined at 1.8% consistency in a double disc refiner to a Canadian Standard Freeness (CSF) of 503 at pH 7.1.

0.175%, based on the weight of the wood pulp on a dry basis, of alkylketene dimer sizing agent, and 0.25%, based on the weight of the wood pulp on a dry basis, of quaternary amine -modified cationic potato starch (A. E. Staley Co.) are added to the pulp.

A control comprising Manitoba unbleached kraft and the same amounts of alkylketene dimer and cationic potato starch is prepared in the manner described above except that the pulp is refined to 505 CSF at pH 6.9.

Both the control and the polyolefin containing pulp are then formed into sheets, dewatered and dried at 149° C. on conventional papermaking equipment. The paperboard sheets are subjected to tensile energy absorption (TEA), dry tensile, wet tensile and percent stretch tests under ambient conditions. The results are given in Table 3. The data are an average of five determinations for TEA, five for dry tensile, five for wet tensile, five for percent stretch and ten for the base weight.

TABLE 3

| | Weight lbs./ream | Dry Tensile lbs./in. MD | Dry Tensile lbs./in. CD | Wet Tensile lbs./in. MD | Wet Tensile lbs./in. CD | % Stretch MD | % Stretch CD | TEA ft. lbs./ft$^2$ MD | TEA ft. lbs./ft$^2$ CD |
|---|---|---|---|---|---|---|---|---|---|
| Control | 165.1 | 76.0 | 48.8 | 4.6 | 3.5 | 1.1 | 3.2 | 5.3 | 12.5 |
| Polyethylene Pulp | 168.5 | 83.1 | 54.2 | 6.1 | 4.5 | 1.4 | 3.4 | 7.2 | 15.4 |

Samples of the same paperboard sheets are brought to an equilibrium moisture content at 25% relative humidity (RH) and are then conditioned and tested at 45% and 95% RH for STFI short span compression in the cross direction and for Z tensile. The results are given to Table 4. The data are an average of twenty determinations for STFI compression and five for Z tensile.

TABLE 4

| | Z Tensile psi 45% RH | Z Tensile psi 95% RH | CD STFI Short Span Compression, lbs./in. 45% RH | CD STFI Short Span Compression, lbs./in. 95% RH |
|---|---|---|---|---|
| Control | 59.8 | 35.0 | 25.1 | 12.0 |
| Polyethylene Pulp | 65.0 | 37.6 | 28.0 | 13.1 |

What I claim and desire to protect by letters patent is:
1. A composition consisting essentially of
   (1) wood pulp,
   (2) from about 1% to about 10%, based on the weight of the wood pulp on a dry basis, of a polyolefin pulp containing carboxylic functionality, and
   (3) from about 0.05% to about 0.6%, based on the weight of the wood pulp on a dry basis, of a cationic water-soluble wet-strength resin.

2. The composition of claim 1 wherein the polyolefin pulp containing carboxylic functionality is based on polyethylene and the cationic wet-strength resin is a water-soluble polyaminopolyamide-epichlorohydrin resin consisting essentially of the reaction product of an aminopolyamide and epichlorohydrin utilizing from about 1 mole to about 1.5 moles of epichlorohydrin for each amine group of the aminopolyamide, said aminopolyamide consisting essentially of the reaction product of a polyalkylene polyamine and a dicarboxylic acid in a mole ratio of polyalkylene polyamine to dicarboxylic acid of from about 0.8:1 to about 1.4:1.

3. The composition of claim 2 wherein the polyolefin pulp containing carboxylic functionality is prepared from a mixture of high density polyethylene and a copolymer of ethylene and acrylic acid.

4. The composition of claim 2 wherein the polyaminopolyamide moiety of the water-soluble resin is derived from adipic acid and diethylenetriamine.

5. Paperboard for use in containers for liquids, prepared from a composition consisting essentially of
   (1) wood pulp,
   (2) from abut 1% to about 10%, based on the weight of the wood pulp on a dry basis, of a polyolefin pulp containing carboxylic functionality, and
   (3) from about 0.05% to about 0.6%, based on the weight of the wood pulp on a dry basis, of a cationic water-soluble wet-strength resin.

6. The paperboard of claim 5 wherein the polyolefin pulp containing carboxylic functionality is based on polyethylene and the cationic wet=strength resin is a water-soluble polyaminopolyamide-epichlorohydrin resin consisting essentially of the reaction product of an aminopolyamide and epichlorohydrin utilizing from about 1 mole to about 1.5 moles of epichlorohydrin for each amine group of the aminopolyamide, said aminopolyamide consisting essentially of the reaction product of a polyalkylene polyamine and a dicarboxylic acid in a mole ratio of polyalkylene polyamine to dicarboxylic acid of from about 0.8:1 to about 1.4:1.

7. The paperboard of claim 8 wherein the polyolefin pulp containing carboxylic functionality is prepared from a mixture of high density polyethylene and a copolymer of ethylene and acrylic acid.

8. The paperboard of claim 8 wherein the polyaminopolyamide moiety of the water-soluble resin is derived from adipic acid and diethylenetriamine.

* * * * *

UNITED STATES PATENT AND TRADEMARK OFFICE
CERTIFICATE OF CORRECTION

PATENT NO. : 4,613,635
DATED : September 23, 1986
INVENTOR(S) : Peter G. Bither

It is certified that error appears in the above-identified patent and that said Letters Patent is hereby corrected as shown below:

Claims 7 and 8 should depend from claim 6.

Column 8, Claim 7 - line 13;

"claim 8"  should read  --claim 6--

Column 8, Claim 8 - line 17;

"claim 8"  should read  --claim 6--

Signed and Sealed this

Twenty-fourth Day of May, 1988

Attest:

DONALD J. QUIGG

*Attesting Officer*  *Commissioner of Patents and Trademarks*